US010243945B1

(12) United States Patent
Kruse et al.

(10) Patent No.: US 10,243,945 B1
(45) Date of Patent: Mar. 26, 2019

(54) MANAGED IDENTITY FEDERATION

(71) Applicant: Amazon Technologies, Inc., Reno, NV (US)

(72) Inventors: William Frederick Kruse, Seattle, WA (US); Bradley Jeffery Behm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/065,106

(22) Filed: Oct. 28, 2013

(51) Int. Cl.
H04L 29/06 (2006.01)

(52) U.S. Cl.
CPC ...... H04L 63/0815 (2013.01); H04L 63/0884 (2013.01)

(58) Field of Classification Search
CPC .................................................. H04L 63/0815
See application file for complete search history.

(56) References Cited

U.S. PATENT DOCUMENTS

| | | |
|---|---|---|
| 5,179,591 A | 1/1993 | Hardy et al. |
| 5,200,999 A | 4/1993 | Matyas et al. |
| 5,497,421 A | 3/1996 | Kaufman et al. |
| 6,084,969 A | 7/2000 | Wright et al. |
| 6,097,817 A | 8/2000 | Bilgic et al. |
| 6,185,316 B1 | 2/2001 | Buffam |
| 6,453,416 B1 | 9/2002 | Epstein |
| 6,826,686 B1 | 11/2004 | Peyravian et al. |
| 6,851,054 B2 | 2/2005 | Wheeler et al. |
| 6,957,393 B2 | 10/2005 | Fano et al. |
| 6,959,394 B1 | 10/2005 | Brickell et al. |
| 6,985,583 B1 | 1/2006 | Brainard |
| 7,010,689 B1 | 3/2006 | Matyas et al. |
| 7,073,195 B2 | 4/2006 | Brickell et al. |
| 7,139,917 B2 | 11/2006 | Jablon |
| 7,228,417 B2 | 6/2007 | Roskind |
| 7,320,076 B2 | 1/2008 | Caronni |
| 7,512,965 B1 | 3/2009 | Amdur et al. |

(Continued)

FOREIGN PATENT DOCUMENTS

| | | |
|---|---|---|
| WO | WO2006077822 | 7/2006 |
| WO | WO2008024705 | 2/2008 |
| WO | WO2014063361 | 5/2014 |

OTHER PUBLICATIONS

Liu, WeiYi; Tan, Yue; Zhang, Enwei; "Service Token for Identity Access Management", Asia-Pacific Services Computing Conference (APSCC), IEEE, Dec. 7-11, 2009, pp. 35-39.*

(Continued)

*Primary Examiner* — Victor Lesniewski
(74) *Attorney, Agent, or Firm* — Davis Wright Tremaine LLP

(57) ABSTRACT

Managed identity federation provides numerous options for authentication to access one or more services. A user authenticates with an identity verification provider and provides proof of authentication to a service of a service provider. The service of the service provider is configured to verify the user's identity using a centrally managed identity provider configuration. This configuration is distributed without intervention of the service's administrators. This centrally-managed configuration allows a variety of enterprise and third-party services to utilize the service provider's billing, security, and other administrative services.

21 Claims, 11 Drawing Sheets

(56) References Cited

U.S. PATENT DOCUMENTS

| | | |
|---|---|---|
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van de Horst et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1 | 10/2014 | Hamlet et al. |
| 8,892,865 B1 | 11/2014 | Roth |
| 9,043,886 B2 * | 5/2015 | Srinivasan ............... H04L 63/10 726/6 |
| 9,191,381 B1 * | 11/2015 | Popp ...................... H04L 63/08 |
| 9,203,829 B1 * | 12/2015 | Levine ............... H04L 63/0815 |
| 9,596,122 B2 * | 3/2017 | Hinton ................... H04L 67/16 |
| 9,596,123 B2 * | 3/2017 | Hinton ................... H04L 41/00 |
| 9,794,239 B1 * | 10/2017 | Chaudhry ............... G06F 21/31 |
| 9,836,702 B2 * | 12/2017 | Hinton ................... G06Q 10/00 |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0135740 A1 | 7/2003 | Talmor et al. |
| 2003/0145197 A1 | 7/2003 | Lee et al. |
| 2003/0149781 A1 * | 8/2003 | Yared et al. .................. 709/229 |
| 2003/0188117 A1 | 10/2003 | Yoshino et al. |
| 2004/0088260 A1 | 5/2004 | Foster et al. |
| 2004/0103096 A1 | 5/2004 | Larsen |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 * | 12/2005 | Hyndman et al. ............ 713/185 |
| 2005/0289341 A1 * | 12/2005 | Ritola ................. H04L 63/0815 713/168 |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Waleczak, Jr. et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 * | 9/2006 | Pearson et al. .................... 726/4 |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane |
| 2007/0186102 A1 | 8/2007 | Ng |
| 2007/0226785 A1 * | 9/2007 | Chow ...................... H04L 63/08 726/8 |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0040773 A1 | 2/2008 | Albadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0229383 A1 * | 9/2008 | Buss ...................... G06F 21/41 726/1 |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0210712 A1 | 8/2009 | Fort |
| 2009/0210930 A1 * | 8/2009 | Lexcellent .......... H04L 63/0815 726/4 |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2009/0320095 A1 * | 12/2009 | Nanda ................... G06F 21/33 726/2 |
| 2010/0011421 A1 * | 1/2010 | Chari ................. H04L 63/0815 726/5 |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 * | 3/2010 | Cheng et al. ................. 726/16 |
| 2010/0083001 A1 | 4/2010 | Shah et al. |
| 2010/0100926 A1 * | 4/2010 | Binding ................... G06F 21/41 726/1 |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0154046 A1 * | 6/2010 | Liu ...................... G06F 21/41 726/8 |
| 2010/0205649 A1 | 8/2010 | Becker et al. |
| 2010/0239095 A1 | 9/2010 | Carter et al. |

(56) References Cited

U.S. PATENT DOCUMENTS

| | | | |
|---|---|---|---|
| 2010/0251347 A1 | 9/2010 | Roskind | |
| 2010/0269156 A1 | 10/2010 | Hohlfeld et al. | |
| 2010/0275009 A1* | 10/2010 | Canard | H04L 63/0421 713/155 |
| 2010/0290476 A1 | 11/2010 | Brindle et al. | |
| 2010/0332845 A1 | 12/2010 | Asaka | |
| 2011/0004753 A1 | 1/2011 | Gomi et al. | |
| 2011/0010538 A1 | 1/2011 | Falk | |
| 2011/0010762 A1* | 1/2011 | Nijdam | H04L 63/0815 726/5 |
| 2011/0035593 A1 | 2/2011 | Pyle et al. | |
| 2011/0055562 A1 | 3/2011 | Adelman et al. | |
| 2011/0055585 A1 | 3/2011 | Lee | |
| 2011/0078107 A1 | 3/2011 | Almeida et al. | |
| 2011/0078448 A1* | 3/2011 | Chow | H04L 63/0807 713/175 |
| 2011/0083015 A1 | 4/2011 | Meier | |
| 2011/0099362 A1 | 4/2011 | Naga et al. | |
| 2011/0131415 A1 | 6/2011 | Schneider | |
| 2011/0138192 A1 | 6/2011 | Kocher et al. | |
| 2011/0167479 A1 | 7/2011 | Maes | |
| 2011/0179469 A1 | 7/2011 | Blinn et al. | |
| 2011/0231940 A1 | 9/2011 | Perumal et al. | |
| 2011/0239283 A1* | 9/2011 | Chern | 726/6 |
| 2011/0252229 A1 | 10/2011 | Belenkiy et al. | |
| 2011/0265172 A1 | 10/2011 | Sharma et al. | |
| 2011/0296497 A1 | 12/2011 | Becker | |
| 2011/0296504 A1* | 12/2011 | Burch | H04L 63/0815 726/6 |
| 2011/0311055 A1 | 12/2011 | Parann-Nissany | |
| 2011/0320606 A1 | 12/2011 | Madduri et al. | |
| 2012/0017095 A1 | 1/2012 | Blenkhorn et al. | |
| 2012/0020474 A1 | 1/2012 | Kudoh et al. | |
| 2012/0023334 A1 | 1/2012 | Brickell et al. | |
| 2012/0036551 A1 | 2/2012 | Le Saint et al. | |
| 2012/0054625 A1* | 3/2012 | Pugh et al. | 715/736 |
| 2012/0060035 A1 | 3/2012 | Kalmady et al. | |
| 2012/0106735 A1 | 5/2012 | Fukuda | |
| 2012/0110636 A1 | 5/2012 | Van Biljon et al. | |
| 2012/0144034 A1* | 6/2012 | McCarty | 709/225 |
| 2012/0159577 A1 | 6/2012 | Belinkiy et al. | |
| 2012/0233216 A1 | 9/2012 | Lim | |
| 2012/0243687 A1 | 9/2012 | Li | |
| 2012/0245978 A1 | 9/2012 | Jain | |
| 2012/0265690 A1 | 10/2012 | Bishop et al. | |
| 2012/0317261 A1* | 12/2012 | Ahmavaara | H04L 63/0815 709/223 |
| 2012/0317414 A1 | 12/2012 | Glover | |
| 2013/0031255 A1 | 1/2013 | Maloy et al. | |
| 2013/0086639 A1* | 4/2013 | Sondhi | H04L 63/0815 726/4 |
| 2013/0086657 A1* | 4/2013 | Srinivasan | H04L 63/10 726/6 |
| 2013/0086662 A1 | 4/2013 | Roth | |
| 2013/0086663 A1 | 4/2013 | Roth et al. | |
| 2013/0111217 A1 | 5/2013 | Kopasz et al. | |
| 2013/0132232 A1 | 5/2013 | Pestoni et al. | |
| 2013/0145447 A1 | 6/2013 | Maron | |
| 2013/0166918 A1 | 6/2013 | Shahbazi et al. | |
| 2013/0191884 A1* | 7/2013 | Leicher et al. | 726/4 |
| 2013/0198519 A1 | 8/2013 | Marien | |
| 2013/0205360 A1* | 8/2013 | Novak | H04L 63/0884 726/1 |
| 2013/0227140 A1* | 8/2013 | Hinton | H04L 41/00 709/225 |
| 2013/0254536 A1 | 9/2013 | Glover | |
| 2013/0282461 A1 | 10/2013 | Ovick et al. | |
| 2013/0305050 A1* | 11/2013 | Johnson | H04L 9/321 713/175 |
| 2013/0305378 A1* | 11/2013 | Johnson | G06Q 20/02 726/26 |
| 2013/0318630 A1 | 11/2013 | Lam | |
| 2014/0013116 A1* | 1/2014 | Smith | H04W 12/06 713/168 |
| 2014/0013409 A1* | 1/2014 | Halageri | 726/8 |
| 2014/0020078 A1* | 1/2014 | Canning | H04L 63/0815 726/8 |
| 2014/0082715 A1* | 3/2014 | Grajek et al. | 726/8 |
| 2014/0122866 A1 | 5/2014 | Haeger et al. | |
| 2014/0181925 A1* | 6/2014 | Smith et al. | 726/6 |
| 2014/0208408 A1 | 7/2014 | Bilgen et al. | |
| 2014/0281477 A1 | 9/2014 | Nayshtut et al. | |
| 2014/0281487 A1 | 9/2014 | Klausen et al. | |
| 2014/0282989 A1* | 9/2014 | Young | H04L 63/08 726/9 |
| 2015/0007263 A1* | 1/2015 | Stewart | H04L 63/0815 726/3 |
| 2015/0082039 A1 | 3/2015 | Stalzer et al. | |
| 2015/0089614 A1 | 3/2015 | Mathew et al. | |

OTHER PUBLICATIONS

Lutz, David J.; "Secure AAA by means of Identity Tokens in Next Generation Mobile Environments", Third International Conference on Wireless and Mobile Communications (ICWMC), IEEE, Mar. 4-9, 2007, 6 pages.*

Amazon, "Amazon Prime Video—security considerations," Amazon. com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

Berners-Lee et al., "Uniform Resource Identifier (URI): Generic Syntax," Network Working Group Request for Comments: 3986, The Internet Society 2005 retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014 in International Patent Application No. PCT/US2014/057043, filed Sep. 23, 2014.

International Search Report and Written Opinion dated Dec. 30, 2014 in International Patent Application No. PCT/US2014/057051, filed Sep. 23, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 System Administrator's Guide [online]," May 2012 retrieved Jun. 27, 2012, from http://web.mit.edu/kerberos/krb5-1.10/krb5-1.10.2/doc/krb5-admin.html, 57 pages.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 UNIX User's Guide," dated May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the International Searching Authority, or the Declaration," issued to International Application No. PCT/US/058083 dated Dec. 27, 2012.

Roth et al.,"Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from Internet Jun. 27, 2012, https://tools.ietf.org/html/rfc1994, 13 pages.

U.S. Appl. No. 13/431,760, filed Mar. 27, 2012.

U.S. Appl. No. 13/431,898, filed Mar. 27, 2012.

(56) References Cited

OTHER PUBLICATIONS

Wang et al., "Extending the Security Assertion Markup Language to Support Delegation for Web Services and Grid Services," IEEE International Conference on Web Services 1:67-74, Jul. 11-15, 2005.
Wikipedia, "Physical unclonable function," retrieved Aug. 22, 2013, from http://en.wikipedia.org/wiki/Physical_unclonable_function, 8 pages.
TCG Published, "TPM Main Part 1 Design Principles," Specification Version 1.2, Revision 116, Mar. 1, 2011, 184 pages.
TCG Published, "TPM Main Part 2 TPM Structures," Specification Version 1.2, Level 2 Revision 116, Mar. 1, 2011, 202 pages.
TCG Published, "TPM Main Part 3 Commands," Specification Version 1.2, Level 2 Revision 116, Mar. 1, 2011, 339 pages.
International Search Report and Written Opinion dated Oct. 22, 2014, International Patent Application No. PCT/US2014/042569, filed Jun. 16, 2014.

\* cited by examiner

US 10,243,945 B1

MANAGED IDENTITY FEDERATION

BACKGROUND

The growth of various technologies has enabled the appearance of numerous services. Computing resource services, for example, enable organizations to utilize computing resources (servers, data storage, etc.) that are hosted by another. By doing so, organizations are able to quickly and effectively create new service offerings while at the same time avoiding substantial capital expenditures, avoiding complexities of hosting one's own computing resource hardware and taking advantage of various advantages such as scalability, durability, and redundancy.

Despite the numerous advantages provided by computing resource services, modern services can nevertheless be quite complex. A single service, for example, may rely on multiple other services and/or subsystems, each playing a particular role in a particular offering. Many services, for example, operate using the notion of user or other accounts and, as a result, require users to prove their identity, typically by providing credentials (e.g., username and password) that are then verified by a verification system. While authentication for a user is, generally, a simple process, an overall system that verifies user identities can be quite complex and, generally, management of user identities has numerous issues. Users may, for example, come and go, requiring constant management of a dynamic set of user accounts. Further, users often have accounts with so many providers that they are often reluctant to create another account with yet another provider. Conventional techniques for addressing these issues, while effective for addressing some of the issues, often introduce their own complexities.

BRIEF DESCRIPTION OF THE DRAWINGS

Various embodiments in accordance with the present disclosure will be described with reference to the drawings, in which.

DETAILED DESCRIPTION

Figure 1:
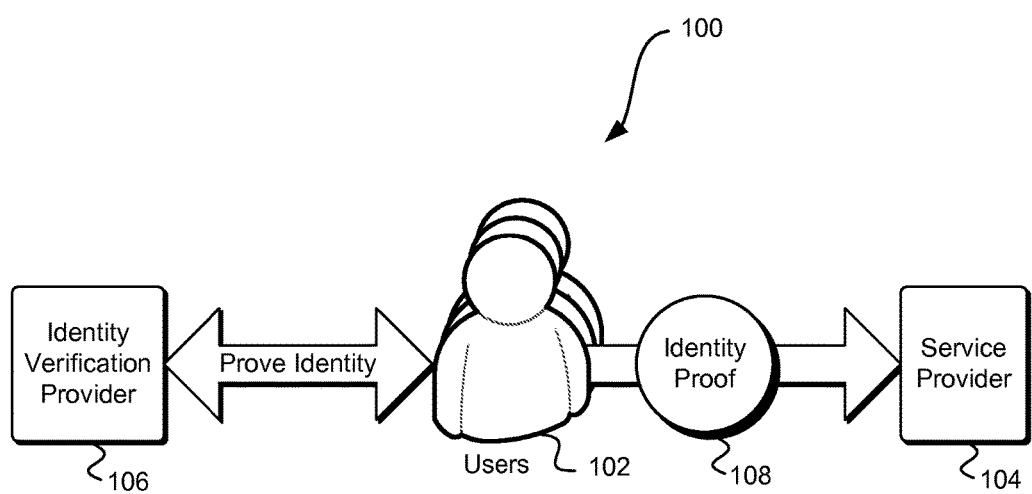
FIG. 1 shows an illustrative diagram of various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to managed identity federation. A system configured to provide one or more services (service provider) may require users of the system to authenticate identity before the system will perform certain operations and, generally, before the system will provide access to the one or more services. In various embodiments, the service provider is configured to allow flexibility in how users authenticate through managed identity federation. For example, the service provider may allow users to authenticate by first authenticating with one of several authorized third party systems and provide proof of authentication with an authorized third party system that the service provider is configured to verify. The authorized third party systems may be in addition to an authentication system of the service provider. In this manner, users are provided the freedom to access services of the service provider without necessarily having to maintain authorization credentials for the service provider separately from credentials for one or more other service providers.

To enable efficient and effective managed identity federation, in various embodiments, the service provider is configured to verify identity information (e.g., a token attesting to a user having successfully authenticated) generated by identity verification providers (third-party and/or otherwise) without certain communications required by many conventional systems utilizing managed federation techniques. For example, in some embodiments, a service of a service provider that receives from a requestor (e.g., a client computer system operated by a human user or automated process) a request with identity information is configured to verify the identity information without a communication to another service, such as a central verification service configured to verify identity information for one or more providers and replace the identity information with identity information for the service provider that provides access to the service for which access is requested. Further, in some embodiments, a computing device (e.g., web server) is configured to verify identity information generated by an identity verification provider without synchronous communication with another computing device (e.g., application server configured to verify identity information for a fleet of web servers). In this manner, the computing device that receives a request with identity information is able to verify identity information without relying on the availability of other systems and without the latency caused by additional communications to the other systems.

In some embodiments, the ability of one or more systems to utilize various managed identity federation techniques is centrally managed for a service provider. For example, a subsystem of the service provider may be configured to maintain information about a set of identity verification providers (possibly including an identity service provider subsystem of the service provider). The information maintained may be information required for verification of identity information (which may include an identity assertion) generated by the identity verification providers. The information may specify how to verify identity information for each of the identity verification providers (e.g., in the form of specification of one or more algorithms which may be in the form of executable code) and/or other information needed to verify the identity information of an identity verification provider. The other information needed to verify the identity information may include, for example, one or more cryptographic keys usable to decrypt identity information and/or verify digital (electronic) signatures of identity information, and information regarding how to interpret how the identity verification provider's formatting of identity information, which may vary among different identity verification providers. The other information may, for each identity verification provider of multiple identity verification providers, indicate how to map identity information of the identity verification provider to a format utilized by the service provider for processing. Generally, any information needed and/or otherwise usable to verify identity information may be used.

The maintained information about a set of identity verification providers may be provided to subsystems of the service provider in the form of an identity verification provider configuration, which may comprise some or all of the maintained information organized in a manner suitable for processing by the subsystems. Each subsystem (e.g., service and/or web server of a service) may be provided information for a set of identity verification providers for which the subsystem is authorized to verify identity information. Further, the set of identity verification providers for which a subsystem is authorized to verify identity information may vary among the subsystems. Some services, for example, may require stronger authentication proof than others and, as a result, such services may not be authorized to verify identity information from identity verification providers that do not require the stronger authentication or that do not offer verifiable proof of stronger authentication in identity information. As the maintained information about the identity verification providers changes over time, identity verification provider configurations may be pushed to the systems that verify identity information in accordance with the changes. For example, if additional identity verification providers become available, the identity verification provider configuration may be updated for one or more services to allow for verification of identity information generated by the additional identity verification provider(s). Similarly, if one or more identity verification providers become unauthorized, identity verification provider configurations for one or more services may be updated accordingly.

In various embodiments, a service provider operates multiple services and/or is configured to verify identity information for one or more other services which may be third-party services hosted by the service provider or otherwise. A user may communicate with multiple services and, accordingly, techniques described and suggested herein may be used to enable the user to use a single identity verification provider to access the multiple services. Moreover, techniques of the present disclosure allow for enhanced privacy for users that utilize multiple services. For instance, in some embodiments, identity verification provider configurations include mappings of identity verification provider identifiers (e.g., usernames or other identifiers) to client identifiers that are unique within a service. These mappings, however, vary among the services such that a user device communicating with multiple services may correspond to different client identifiers for the multiple different services. (Although, it should be noted that the scope of the present disclosure includes embodiments where the same user device is mapped to the same client identifier in two or more services). The client identifiers may be used by the services to track usage of the service and, generally, to perform operations dependent on client identifiers. By using different client identifiers for the same client, the services are prevented from coordinating and tracking user activity across multiple services.

Various embodiments, however, also provide enhanced backend services such as usage tracking, logging, and accounting (e.g, charging for use of services). In an embodiment, a service provider uses different client identifiers for the same user device (possibly the same user) in different services. The service provider may include one or more backend systems including, but not limited to an accounting system, a logging system and/or generally other backend systems. The services may report usage information that associates client identifiers with corresponding use of the services. The backend services may be configured to map the client identifiers to corresponding users and aggregate usage information across multiple services for a single customer of the service provider. For example, usage information for a client identifier used in one service and usage information for a client identifier used in a second service may be mapped to the same user and the usage information may be aggregated for various purposes, such as accounting, logging and the like. In this manner, the service provider (and/or customers thereof that utilize the service provider to provide their own services) can obtain accurate information about use of the services.

Other variations are also considered as being within the scope of the present disclosure. For example, as discussed, a service provider may provide services that enable one or more other third-party service providers to provide their own services. Third-party service providers may, for instance, utilize computing resources of the service provider to provide access to data stored in a data storage service of the service provider and/or to configure a computer network at least partially hosted by the service provider. Techniques of the present disclosure allow such third-party service providers to focus on the services they provide with minimal attention and effort spent with respect to identity authentication. In various embodiments, a third-party service provider is able to utilize the services of the service provider to provide its own third-party services. The service provider provides an authenticated endpoint service where a service provider manages user authentication in connection with customers of the third-party service provider. The service provider may receive requests and corresponding identity information from the customers of the third-party service provider, and verify the identity information for the third-party service provider. Requests may be denied by the service provider if corresponding identity information is not verified and may be passed on to the computing resources (e.g., servers) of the third-party service provider when successfully verified. In this manner, the third-party service provider is able to offer its services without the time and effort required to maintain its own system for identity authentication (although, a third-party service provider may maintain its own system for identity authentication and utilize an authenticated endpoint service to expand the ways in which its customers are able to authenticate). Further, techniques of the present disclosure also allow for use of an authenticated endpoint service for third party services that are, in part or in whole, hosted using other networks, such as other computing resource service providers and/or onpremises systems. Other variations, some of which are described below, are also considered as being within the scope of the present disclosure.

FIG. 1 shows an illustrative example of a diagram 100 illustrating various aspects of the present disclosure. In an embodiment, the diagram 100 illustrates users 102 that utilize one or more services of a service provider 104. The service provider 104 may be a system configured to provide one or more services to the user 102. In various embodiments, services provided by the service provider 104 are related to computing resources and the particular services provided may vary in accordance with various embodiments. For example, in some examples the service provider 104 provides a website navigable by the users 102. As another example, the service provider 104 may provide various computing resource services to enable the users 102 to configure and manage computing resources that are hosted by the service provider 104 for various purposes such as to enable the users 102 to configure computer networks that are at least in part hosted by the service provider 104 using hardware resources managed by the service provider 104. Generally, while specific examples are used throughout, the service provider 104 may be any provider of one or more services that are accessible to users 102. Further, it should be understood that access of the services of the service provider 104 by the users 102 may occur through appropriate computing devices such as those enumerated below. For example, a human operator may provide user input to a computing device to cause communications to be transmitted over a network to the service provider 104 where at least some of the communications correspond to navigation of a website provided by the service provider 104 and generally correspond to utilization of services provided by the service provider 104.

As illustrated in FIG. 1, when a user 102 utilizes services of the service provider 104, the user 102 may communicate with an identity verification provider 106. An identity verification provider may be an entity that provides, through appropriately configured systems, services related to management of identities. As one example, an identity verification provider 106 may manage information corresponding to a plurality of accounts where each account may correspond to an entity such as a human user and/or a non-human organization. An identity verification provider 106 may provide its own services, such as social networking services, electronic mail services, electronic commerce services and/or other services and may utilize accounts for accessing those services in addition to providing services for proving successful authentication to other services. The user 102 may communicate with the identity verification provider 106 to provide the identity verification provider information sufficient to prove that the communications originate from a user corresponding to a particular identity. As a specific example, a user 102 may provide a username and password to the identity verification provider 106 and the identity verification provider 106 may determine whether the provided password matches an identity corresponding to the username that was provided. It should be noted however that while username and password are used as examples of credentials used to prove identity, other information may also be used including but not limited to biometric information, location information, one-time password values (e.g., from a one-time password token device), biographical information and generally any information that may correspond to an identity. Some or all of the information provided by a user may uniquely correspond to the user.

As illustrated in FIG. 1, users 102 can communicate with the identity verification provider 106 in order to obtain identity proof 108 which the users 102 may provide to the service provider 104. In an embodiment, identity proof comprises information sufficient for presentation to the service provider 104 to indicate to the service provider 104 that the identity verification provider 106 has successfully verified an identity of a user that presented the identity proof 108. The requirements for identity proof to be sufficient may vary in accordance with the various embodiments depending on service provider requirements. As discussed below, various techniques may be utilized in order to provide information that the identity proof is authentic. In some examples, the identity proof is cryptographically verifiable. For example, the identity proof may be encrypted or otherwise cryptographically derived. A service provider's ability to decrypt the identity proof may serve as proof that the identity proof is authentic. As another example, the identity proof may be provided with a digital signature and verification by a service provider of the digital signature may serve as proof that information in the identity proof has not been modified since generation by the identity verification provider. Generally, output of one-way functions, which may be referred to as digital signatures, hashes, message authentication codes (e.g., hash-based message authentication codes), digests and/or other types of information may be used by a service provider to verify authenticity of identity proof. In this manner the service provider 104 can utilize the identity proof 108 to determine that communications purporting to be from a particular identity are in fact from the identity where verification of the identity is performed by the identity verification provider 106.

Figure 2:
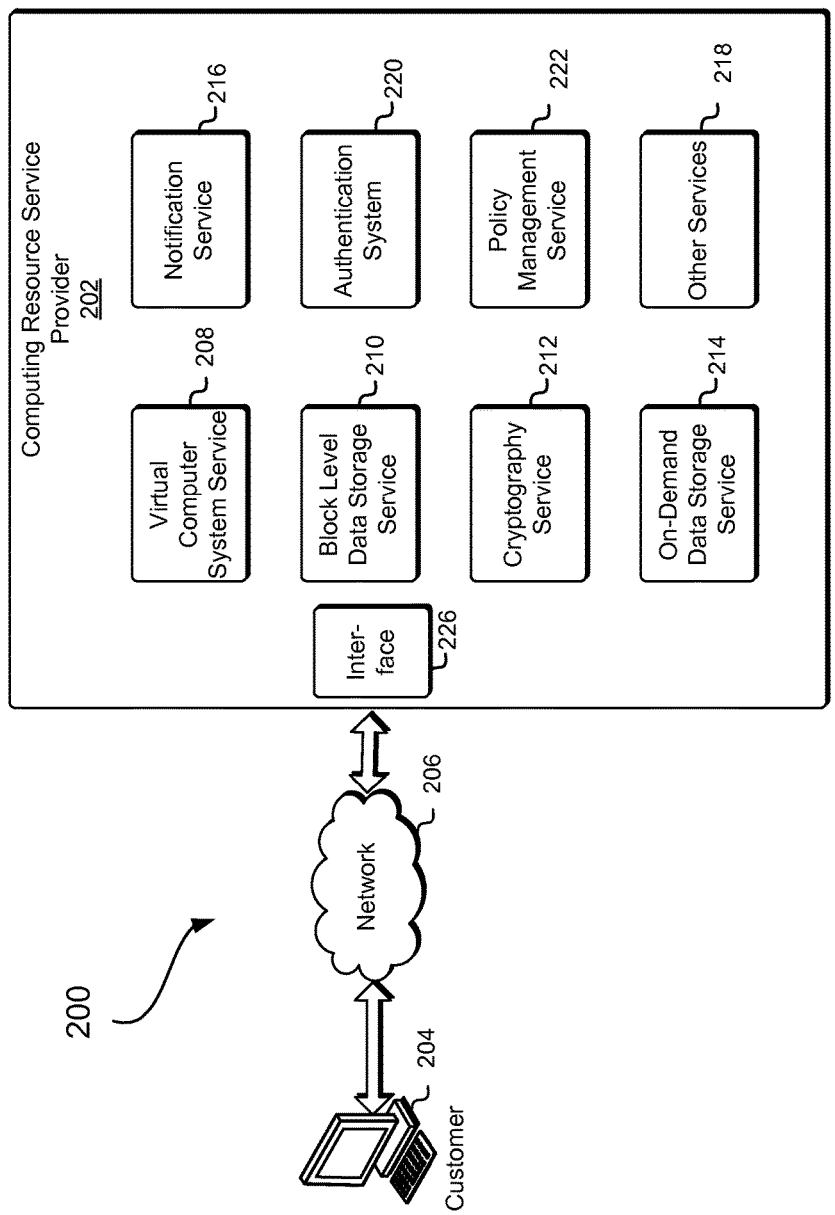
FIG. 2 shows an illustrative example of an environment in which various embodiments can be practiced.

FIG. 2 shows an example of a customer communicating with an example computing resource service provider. The computing resource service provider 202 may provide a variety of services to a customer 204 via an interface 226, which may be a web services interface or any other type of customer interface. While FIG. 2 shows an interface 226 for the services of the computing resource service provider, each service may have its own interface and, generally, subsets of the services may have corresponding interfaces in addition to or as an alternative to the interface 226. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such the Internet, an intranet or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202, in this example, include a virtual computer system service 208, a block-level data storage service 210, a cryptography service 212, an on-demand data storage service 214 and one or more other services 218. It is noted that not all embodiments described herein include the services 208-218 of the computing resource service provider 202 and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service 214 and/or to access one or more block-level data storage devices provided by the block-level data storage service 210).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 208 is shown in FIG. 2, any other computer system or computer system service may be utilized in the computing resource service provider 202, such as a computer system or computer system service that does not employ virtualization or instantiation and instead provisions computing resources on dedicated or shared computers/servers and/or other physical devices.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The computing resource service provider 202 may also include an on-demand data storage service 214. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key-value store that associates data objects with identifiers of the data objects which may be used by the customer 204 to retrieve or perform other operations in connection with the data objects stored by the on-demand data storage service 214. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based at least in part on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication system 220 and a policy management service 222. The authentication system, in an embodiment, is a computer system (i.e., collection of computing resources) configured to perform operations involved in authentication of users of the customer. For instance, one of the services may provide information from the users to the authentication service to receive information in return that indicates whether or not the user requests are authentic. The authentication system 220 may also manage identities for the computing resource service provider 202 and, generally, operate as an identity verification provider managed by the computing resource service provider 202. For example, the authentication system may be used to provide an authenticated endpoint service, such as described above, although an authenticated endpoint service may utilize the authentication system 220 but may operate as a separate service, such as a load balancing service that utilizes the virtual computer system service 208 for provisioning and operating load balancer computer systems that verify identity information.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. Other services and/or components may also be included in the environment 200. Similarly, techniques of the present disclosure apply to other environments.

Figure 3:
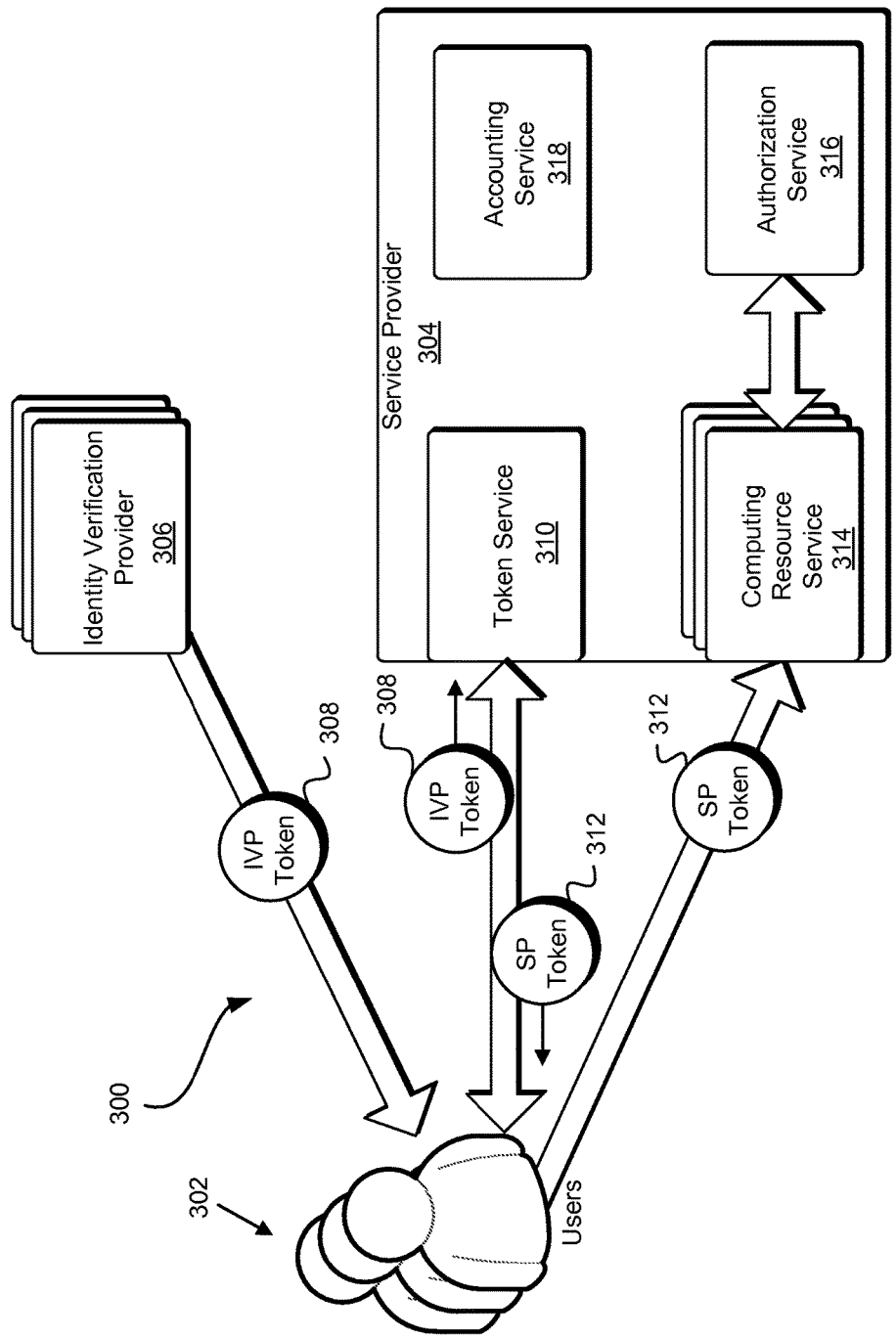
FIG. 3 shows an illustrative example of an environment in which various embodiments may be practiced.

FIG. 3 shows an illustrative example of an environment 300 in which various embodiments can be practiced. In the environment 300 users 302 utilize services of a service provider 304. For example, the users 302 may use one or more appropriate computing devices to transmit communications to the service provider 304 over a network such as described below for the purposes of accessing the services of the service provider 304. In this example, the service provider 304 may for at least some services require proof of identity. Accordingly, as illustrated in FIG. 3 users 302 may communicate with one or more identity verification providers 306 in order to obtain an identity verification provider token 308. As noted above, an identity verification provider 306 may be an entity that operates a system that provides identity verification services for use by others and/or possibly itself. It should be noted that for simplification various operations are described as being performed by various entities (e.g., service providers, users and identity verification providers). In such instances, unless otherwise stated or otherwise clear from context, the operations are performed by a computer system operated by or on behalf of the entity. For example, when a user communicates with an identity verification provider, a device of the user may transmit an appropriately configured communication to a server of the identity verification provider over a network. When an identity verification provider generates identity information (e.g., token), a server of the identity verification provider may generate the identity information. When a service verifies identity information generated by an identity verification provider, a server of the service may perform corresponding calculations and other operations.

As illustrated in FIG. 3, a user 302 may obtain an identity verification provider token 308 from an identity verification provider 306, which may be a third-party system or (while not illustrated as such in the figure) may be a subsystem of the service provider 304. Generally, a set of identity verification providers may include both one or more third-party identity verification providers and one or more identity verification providers of the service provider 304. The user 302 may provide appropriate credentials that are verified by the identity verification provider 306 and in response to having been provided correct credentials the identity verification provider 306 may generate and provide the identity verification provider token 308 to the user. The user 302 may also provide other relevant information usable by the identity verification provider, such as an identifier of a service for which identity information is to be used to prove identity. The identity verification provider may use the relevant information to produce a token suitable for processing by a system to which the user will present the token as proof of identity. For example, the identity verification provider may use an appropriate key to encrypt and/or digitally sign the token so as to be verifiable by the service provider identified by the user.

The identity verification provider token 308 may comprise various types of information relevant to verification of an identity of the user 302. In some embodiments, for example, the identity verification provider token 308 includes information indicating an attestation of the identity verification provider 306 (that provided the identity verification provider token) has verified the identity of the user to whom the identity verification provider token 308 has been issued. The identity verification provider token 308 may also include information usable by the service provider to match the token to the user 302. For example, if the user presents the token in a communication purporting to be from an identity (e.g., johndoe@example.com), the token may encode an identifier of the identity. Further, the token may encode information (e.g., Internet Protocol (IP) address, media access control (MAC) address, or other identifier, usable by the service provider to verify that a device that requested and received the token is the same device that presented the token to the service provider, thereby enabling the service provider to prevent tokens from being intercepted and/or otherwise obtained in an unauthorized manner and presented to obtain access to one or more services.

Further, the identity verification provider token 308 may also include and/or be configured to enable verification by the service provider 304 that the identity verification provider token 308 is authentic when presented by a user 302. In some embodiments, for example the identity verification provider token 308 is encrypted such that the identity verification provider token 308 is decryptable using a cryptographic key accessible to the service provider 304 and not accessible to other entities (e.g., to users 302). In this manner, the fact that the service provider 304 is able to decrypt the identity verification provider token 308 provides assurances that the identity verification provider token 308 has not been altered because alteration would require access to the key used to decrypt the identity verification provider token 308. In other embodiments the identity verification provider token 308 includes a digital signature verifiable by a key accessible to the service provider 304 but not accessible to other entities that may have access to the identity verification provider token 308 such as the user 302 that presented the identity verification provider token 308 to the service provider 304. Other techniques including combinations of electronic signatures and encryption may be used to provide for verification of authenticity of identity verification provider tokens.

As shown in the figure, when a user 302 receives an identity verification provider token 308 the user 302 may provide the identity verification provider token 308 to a token service 310 of the service provider 304. The token service 310 of the service provider 304 may be a subsystem of the service provider 304 configured to verify identity verification provider token 308. In some embodiments, for example the service provider 304 utilizes an appropriate cryptographic key to decrypt an identity verification provider token 308 presented to it by a user 302 and determines whether the decrypted identity verification provider token 308 provides an adequate attestation as to an identity of the user 302 that presented the identity verification provider token 308. As illustrated in FIG. 3, if the token service 310 determines that the identity verification provider token 308 received by the token service 310 is valid, the token service 310 may generate a service provider token 312 and provide the service provider token 312 to the user 302 from which the identity verification provider token 308 was received. In this manner, the token service 310, upon presentation of a valid identity verification provider token 308, exchanges the identity verification provider token 308 for the service provider token 312.

The service provider token 312 may comprise information that attests to an identity of the user that presented the identity verification provider token 308. However, identity specified by the service provider token 312 may encode an identity in a system of the service provider 304 instead of an identity of the user with the identity verification provider 306 that provided the identity verification provider token 308. In this manner, the token service 310 exchanges identity of an identity verification provider 306 for an identity of the service provider 304 thereby enabling a user who has received a service provider token 312 to use the service provider token 312 for accessing services of the service provider 304.

In this particular example, the service provider 304 includes various computing resource services 314 such as described above although as discussed the service provider 304 may provide various types of services in accordance with the various embodiments. In an embodiment when a computing resource service 314 receives a service provider token 312 from a user 302 a computing resource service provides the service provider token 312 to an authorization service 316 (also referred to as an authentication service) of the service provider 304. The authorization service 316 of the service provider 304 may be a system configured to perform various operations related to authorization and authentication such as by verifying a service provider token 312 and provide information indicative of validity of service provider token 312 that has been presented to the authorization service 316. For example, in embodiments where the service provider token 312 is encrypted so as to be decryptable using a key accessible to the authorization service 316, the authorization service 316 may decrypt the service provider token 312 and analyze the information contained therein to determine whether the service provider token 312 is valid. For example, the authorization service 316 may utilize information provided in connection with the service provider token 312 from the computing resource service 314 to determine whether the user 302 that provided the service provider token 312 to the computing resource service 314 corresponds to an identity specified in the service provider token 312.

Upon a positive attestation to validity of the service provider token 312 to the computing resource service 314, the computing resource service 314 may provide one or more services requested by the user 302. It should be noted that tokens, whether identity verification provider token 308 or service provider token 312 may be configured to organize information in various ways in accordance with various embodiments. For example, a token may include an attestation to an identity which is encoded, e.g. encrypted, in any way that enables a determination whether the token corresponds to a user purporting to correspond to a particular identity. Other information determinative of validity of a token may also be included. For example, tokens may be generated with an expiration so that the tokens are presentable for accessing services, whether to a token service 310 or a computing resource service 314, as appropriate, as described above. Validity of a token, whether determined by the token service 310 or the authorization service 316 may be dependent on the token having been presented prior to expiration. Generally, a token may contain the various contextual information that indicates a context in which a token must be presented in order to be valid. The contextual information may include, for example, a network address from which the token must be presented, an identity to which a system presenting the token must purport to be, a time during which the token must be presented, and generally information corresponding to a context from which the token is presentable.

Further, as illustrated in FIG. 3, the service provider 304 may include an accounting service 318. The accounting service 318 may be a system configured to obtain usage information from the computing resource services 314 and compile such information for accounting purposes such as to generate invoices and/or bills and/or generally to obtain value for use of the various computing resource services 314. While not illustrated in FIG. 3, the service provider 304 may comprise other backend services in addition to or instead of an accounting service.

Figure 4:
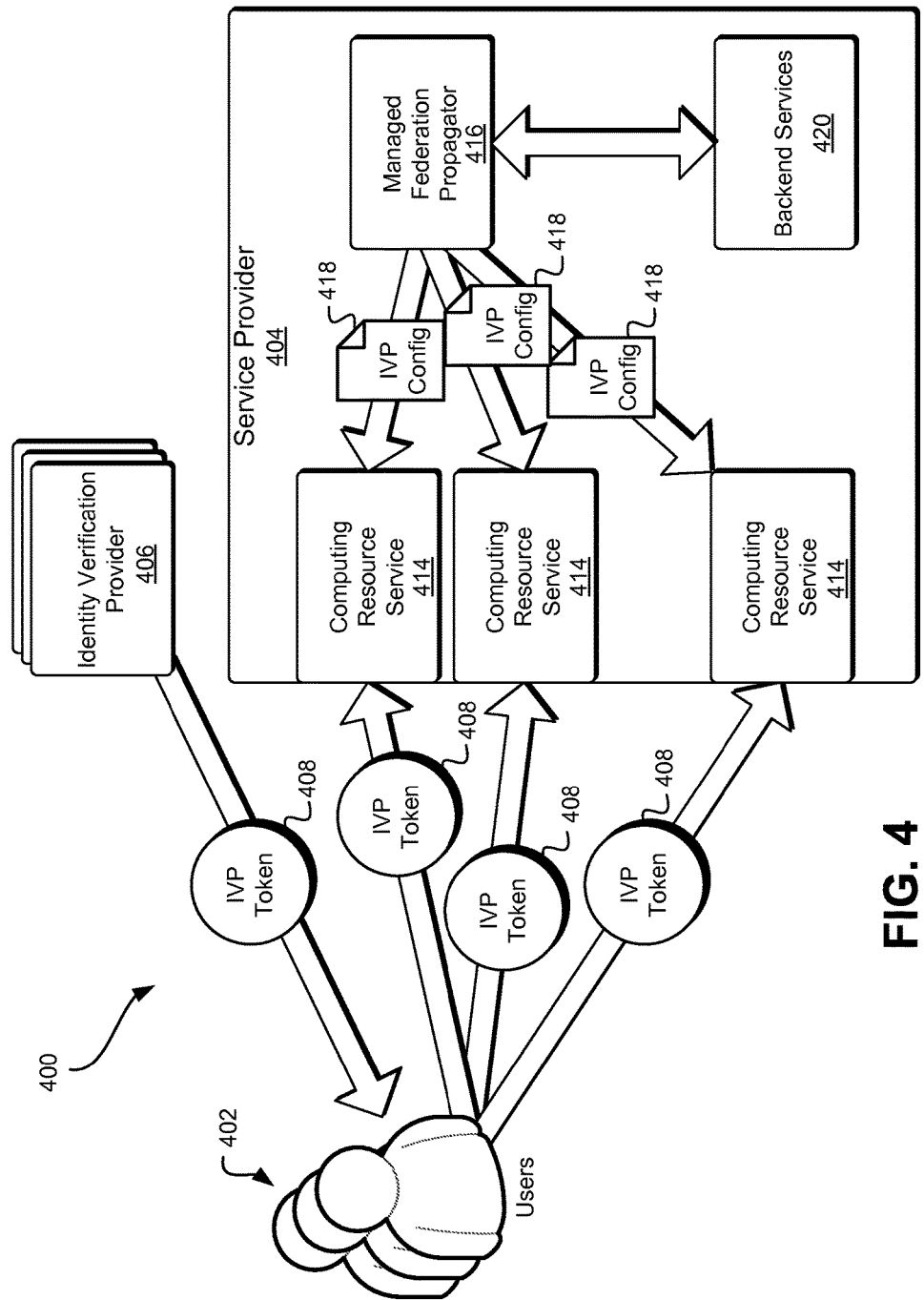
FIG. 4 shows an illustrative example of an environment in which various embodiments can be practiced.

As noted, various embodiments of the present disclosure enable simplification of federated identity techniques. Techniques illustrated in FIG. 3, for example, involve a client computing device communicating with three separate entities (identity verification provider, token service, and computing resource service) and the computing resource service communicating with an authentication service for the fulfillment of a request. In various embodiments, the techniques described herein allow for various technical advantages such as the ability to federate identity while reducing the latency and/or number of communications required for request fulfillment. FIG. 4, accordingly, shows an illustrative example of an environment 400 in which various embodiments can be practiced. The environment 400 may be the environment 300 described above in connection with FIG. 3 or a variation thereof. As illustrated in FIG. 4, the environment 400 includes users that utilize services of a service provider 404 such as described above. As discussed above, a user 402 may communicate with an identity verification provider 406 in order to obtain an identity provider token 408. For example, a user device may be programmatically configured to request an identity provider token 408 from an identity verification provider 406 before attempting access of a service provided by the service provider 404. Accordingly, a user 402 may receive an identity provider token 408 from an identity verification provider 406 upon having provided sufficient proof to the identity verification provider 406 that the user 402 corresponds to an identity managed by the identity verification provider 406. Upon receipt of an identity verification provider token 408, a user 402 may provide the identity provider token 408 to one or more computing resource services 414 of the service provider 404.

However, instead of providing the identity provider token 408 to a token service of the service provider 404 as illustrated in FIG. 3, the identity provider verification token 408 may be provided directly to the computing resource service for access. As discussed in more detail below, a computing resource service may be configured to verify identity verification provider tokens 408 without participation of a token service 310 of the service provider 304. To enable the computer resource services 414 to verify identity provider tokens 408, the computer resource services 414 may be configured with appropriate programming logic to enable verification of the identity provider tokens 408. Further, the service provider 404 may include a managed federation propagator 416 which may be a system configured to manage service configuration information which, in the illustrative example of FIG. 4, may be in the form of identity verification provider configurations 418 for each of the computing resource services 114. The managed federation propagator 416 may maintain information about how identity provider verification tokens 408 are verifiable for the various identity verification providers 406. The managed federation propagator 416 may, for instance, collect cryptographic information usable to verify tokens from a set of identity verification providers. The cryptographic information may be collected in any way, such as through input of an administrator of the managed federation propagator, through application programming interface (API) updates provided from identity verification providers and/or in other ways. Periodically or aperiodically, the managed federation propagator 416 may provide updated identity verification provider configurations 418 to the computing resource services 414 as appropriate in order to enable the computing resource services 414 to verify identity provider verification tokens 408 provided by the identity verification providers 406.

In an embodiment, each computing resource service 414 that receives an identity verification provider configuration 418 from the managed federation propagator 416 reconfigures to operate in accordance with the received identity verification provider configuration 418. Further, in some embodiments, each computing resource service that receives an identity verification provider configuration receives a different identity verification provider configuration 418 that is specific to the computing resource service 414. (Although, the scope of the present disclosure extends to embodiments where two or more services are configured with the same identity verification provider configuration 414.) In some embodiments, a computing resource service 414, upon verification of identity provider token 408, generates a client identifier for a user 402 that provided the identity verification provider token 408. The client identifier may be used in various ways in accordance with various embodiments. For example, the client identifier may be encoded as a value in a cookie provided to the user 402 for use in future communications with the same computing resource service 414, where the cookie may be used for various techniques, such as to encode information for a session and to identify the user across multiple requests. As another example, the client identifier may be encoded in a token that is usable for a session to access one or more services without having to obtain another token from an identity verification provider. The token may be usable with the same service or, in some embodiments, multiple services. Also, as discussed below, the client identifier may be used to track usage of the computing resource service 414. Information about usage of the service may be maintained by the computing resource service in association with the client identifier. The usage information may include information about resources utilized (e.g., number of communications, bandwidth utilized, an amount of data accessed and the like) and/or may include information about charges incurred for resource access.

The identity verification provider configurations 418 may be individually configured so that each of the computing resource services 414 generate a different client identifier for the same user 402 or generally where different subsets of the computing resource services 414 generate different client identifiers for the same user 402. In this manner, when a user communicates multiple times with the computing resource service, the same client identifier may be used by the user 402. However, if the user 402 communicates with different computing resource services 414 the user 402 may receive a different client identifier for different services, thereby preventing the different services from colluding by matching client identifiers. In this manner, tracking a user 402 across multiple services becomes more difficult thereby providing a user 402 greater privacy. It should be noted, however, that embodiments of the present disclosure also include those where each computing resource service is configured to use the same client identifier for the same user 402 and generally where identity verification provider configurations 418 are the same for multiple computing resource services 414.

It should be noted that different client identifiers for the various services of the service provider may be achieved in different ways in accordance with various embodiments. For example, in some embodiments, the service provider 404 may register its services 414 with each identity verification provider 406 as separate entities and provides information (e.g., a cryptographic key used to encrypt identity verification provider identities) for each entity so that each identity verification provider can generate a different identifier for the same user for different services 414. A managed federation propagator may provide updates to the identity verification providers 406, such as by providing appropriate configuration information. As an example of how an identity verification provider can provide multiple identifiers for the same user 402, an identity verification provider 406 may identify the user 402 by a first identifier in a token for a first service 414 and by a different, second identifier for a second service 414. In this manner, the services 414 (e.g., due to lacking the cryptographic keys) do not receive any information that the services can use to collaborate to track users' 402 activities across multiple services. At the same time, a backend service, as described in more detail below, can have access to the cryptographic keys to decrypt identifiers and aggregate usage information.

As noted above, a computing resource service 414 may report usage information to an accounting service. Generally, the service provider 404 may include various backend services 420 that receive such reporting information from the computing resource services 414. In an embodiment, the backend services may include, as discussed above, an accounting service. Other services may also be included in the backend services. For example, the backend services may include services with respect to logging activity and/or generally performing operations in connection with usage of the various computing resource services 414. In an embodiment, one or more of the backend services 420 are configured to match different client identifiers corresponding to the same user 402. Enablement for matching different client identifiers to the same user 402 may, for example, include the backend services being provided identity verification provider configuration information from the managed federation propagator. In this manner, usage of multiple computing resource services 414 by the same user can be aggregated together for various purposes, such as billing of the users 402, security oversight, or of customers of the service provider 404 that utilize services of the service provider 404 for providing their own services to the users 402. For example, in an embodiment backend service 420 may maintain or otherwise have access to a database that associates client identifiers of the same user for different services. As another example, a back end service may be configured with information that enables a client identifier from one service to be mapped to a client identifier of another service. Generally, any way by which the back end service is able to match different client identifiers corresponding to the same user may be used.

As discussed above, numerous variations of the environment 400 are considered as being within the scope of the present disclosure. For example, in some embodiments, the techniques described and suggested herein are usable to provide identity services to other entities. A managed federation propagator 416 may provide identity verification provider configurations 418 to one or more third party services which may operate to verify identity verification provider tokens locally such as described in connection with the computing resource services 414. A backend service of the service provider 404 may process usage information from third party services, possibly aggregating with usage information for other third party services or local computing resource services 414.

Figure 5:
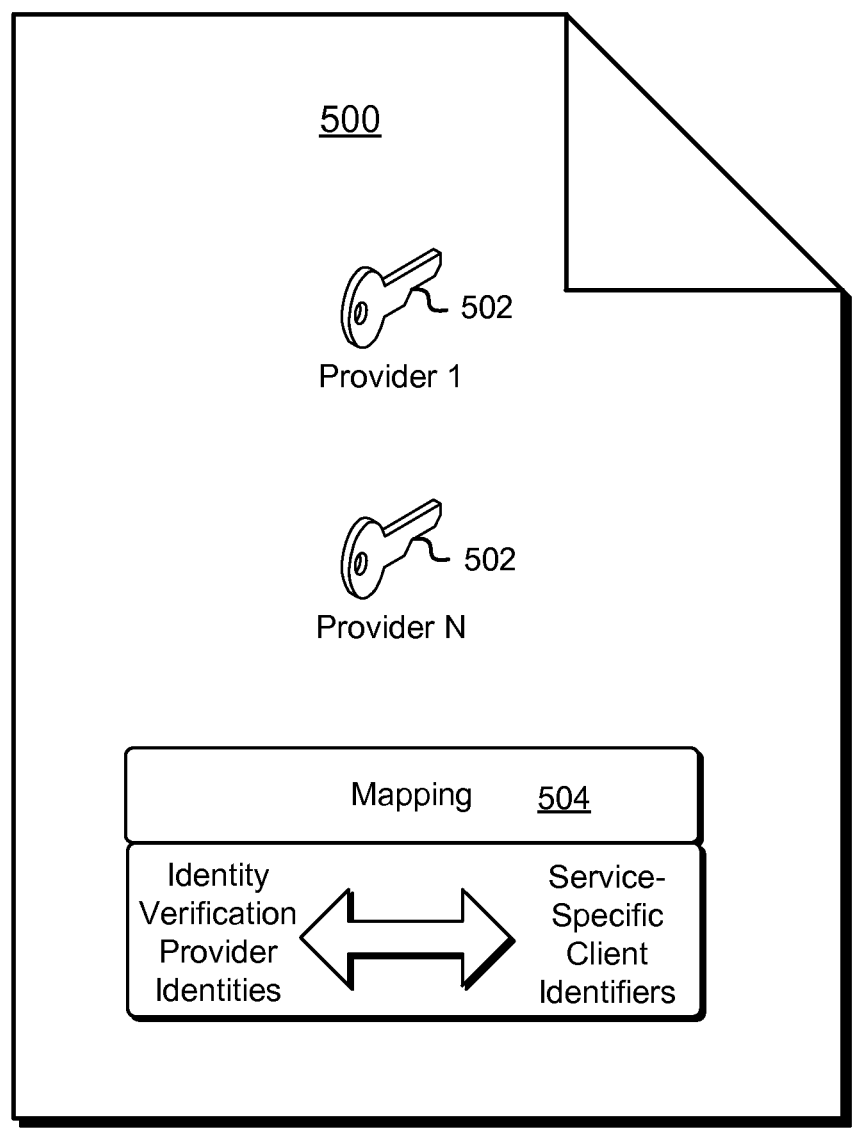
FIG. 5 shows an illustrative example of an identity verification provider configuration in accordance with at least one embodiment.

FIG. 5 shows an illustrative example of an identity verification provider configuration 500 in accordance with various embodiments. While FIG. 5 shows the identity provider configuration having certain information, FIG. 5 is illustrative in nature and identity verification provider configurations may have more information or less information than pictured as well as different types of information. As illustrated in FIG. 5 the identity verification provider configuration 500 includes information that enables verification of identity verification provider tokens. In an embodiment, the identity verification provider configuration 500 includes cryptographic information usable to verify identity verification provider tokens. In the illustrative example of FIG. 5, the cryptographic information comprises a plurality of cryptographic keys 502. Each cryptographic key 502 may correspond to a different identity verification provider. For example, in some embodiments, a cryptographic key 502 is a secret shared between a service provider and a verification provider, but inaccessible to users to whom tokens are provided from the identity verification provider and from whom the tokens are provided to the service provider. As another example, a cryptographic key 502 may be a private key of a public-private key pair where an identity verification provider may encrypt identity verification provider tokens using a public key of the public-private key pair corresponding to the private key. In this manner, by providing cryptographic keys 502 for the various identity verification providers, a computing resource service is enabled to decrypt tokens from those providers and/or verify digital signatures of tokens.

In addition, as illustrative in FIG. 5 the identity verification provider configuration 500 includes a mapping 504 of identity verification provider identities with service specific client identifiers. The mapping 504 may comprise information suitable for determining a service specific client identifier from an identity verification provider identity. The mapping 504 may be configured in various ways in accordance with various embodiments. For example, in some embodiments, the mapping 504 may comprise a table that associates identity verification provider entities with service specific client identifiers. As another example, the mapping 504 may include one or more parameters for input into a function such that the function may be used to determine a service specific client identifier from an identity verification provider identity (or other client-specific information). As an example, the mapping may be a one-way function or a set of parameters for a one-way function whose input is client-specific information (e.g., identify verification provider identity) and one or more service-specific parameters (e.g., cryptographic key, salt, etc.). Suitable one-way functions include hash functions, message authentication code functions, password based key derivation functions such as password based key derivation function 2 (PBKDF2) or Bcrypt. It should be noted that use of one way functions may also include retaining sufficient information such that another backend service is able to match client-specific information to a service-specific client identifier. As another example, the mapping may comprise a service-specific cryptographic key usable to encrypt (e.g., using one or more modes of the advanced encryption standard (AES) or other cryptographic primitives) client-specific information. Generally, the mapping may comprise any information from which a service-specific client identifier may be generated from information specific to a client device and/or user.

Figure 6:
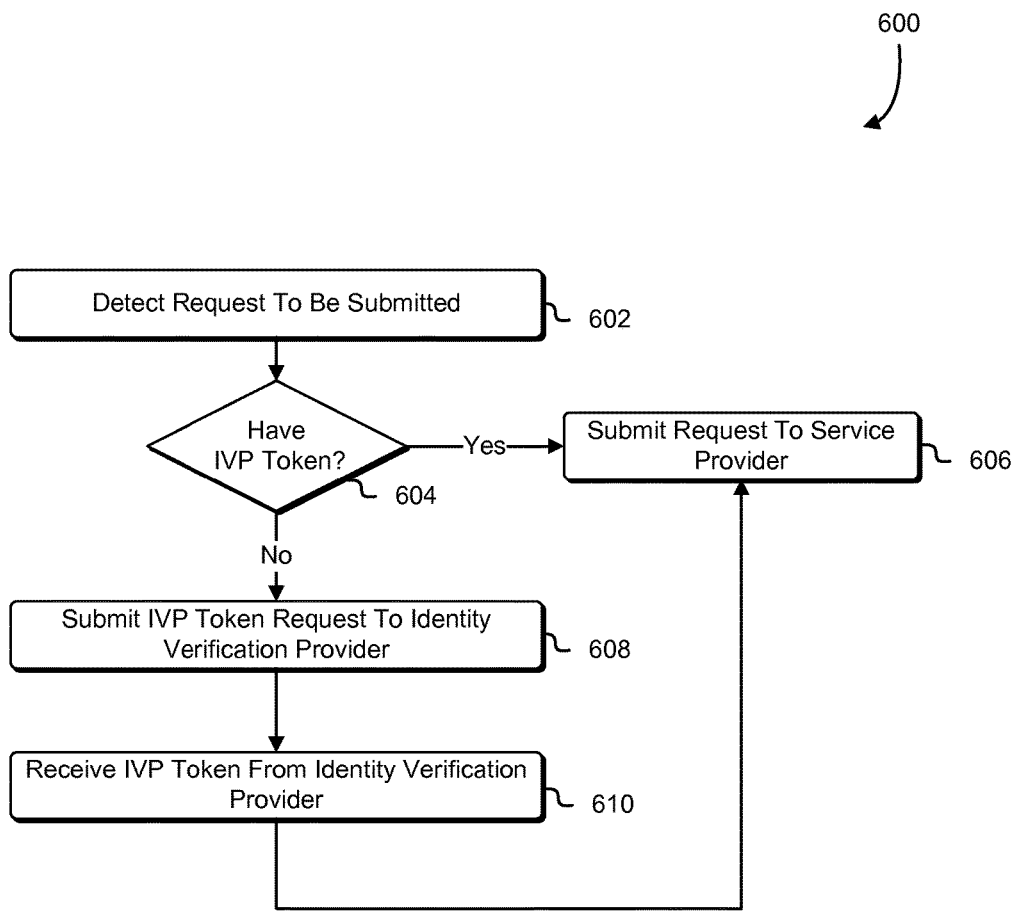
FIG. 6 shows an illustrative example of a process for requesting access to a resource in accordance with at least one embodiment.

FIG. 6 shows an illustrative example of a process 600 which may be used to request access from a service provider in accordance with an embodiment. The process 600 may be performed by any suitable system such as a device of a user such as described above. Generally, any computing device operable to submit requests on behalf of a user may perform the process 600. In an embodiment, the process 600 includes detecting 602 a request to be submitted. Detecting the request to be submitted may be performed in various ways in accordance with various embodiments. For example, in some embodiments detection of the request to be submitted may be performed in accordance with user input with a graphical user interface such as a webpage provided on a browser application of the user device. When a user interacts with the graphic user interface, such as by selecting a graphical user interface element having a corresponding hyperlink, a browser application may detect the selection. Further embodiments of the present disclosure are not limited to browser applications but other applications such as mobile applications where the applications are configured to submit requests in response to user input. It should also be noted that requests are not necessarily submitted in accordance with synchronous user input, such as selection of a user interface element, but may be performed in accordance with automated processes that, at least in part, execute independently of user input.

In an embodiment, once the request to be submitted has been detected 602, the process 600 includes determining 604 whether a system performing the process 600 has a valid identity verification provider token such as described above. For example, the system performing the process 600 may determine whether it has stored a copy of a token and, if so, whether the token has expired or is otherwise in compliance with any conditions for token validity. For instance previous performance of the process 600 or a variation thereof may have caused a system performing the process 600 to have obtained an identity verification provider token that is still valid, for example, because the identity verification provider token has not expired. If it is determined 604 that a system performing the process 600 has a valid identity verification provider token, the process 600 may include submitting 606 a request to the service provider where the request is submitted with the identity verification provider token.

If, however, it is determined 604 that the system performing the process 600 does not have a valid identity verification provider token, the process 600 may include submitting 608 an identity verification provider token request to an identity verification provider. Submitting 608 the identity verification provider token request to the identity verification provider may include selection of an identity verification provider from a plurality of identity verification providers and transmitting the request over a network such as the Internet to the selected identity verification provider. The identify verification provider token request may comprise information usable by the identity verification provider to generate a valid token. The identity verification provider token request may, for instance, specify which service provider is to receive the token that will be generated because, for instance, an identity verification provider may generate tokens differently (e.g., using different cryptographic keys and/or inputs to a cryptographic primitive) for different service providers. Further, submitting 608 the identity verification provider token request to an identity verification provider may include providing information to the provider that enables the identity verification provider to determine whether to fulfill the request. Such information may include, for example, credentials, such as a username and password, or information based at least upon thereon to the identity verification provider. Assuming the request to the identity verification provider is fulfillable by the identity verification provider the process 600 may include receiving 610 an identity verification provider token from the identity verification provider. Accordingly, the process 600 may include submitting 606 the request to the service provider such as described above.

Figure 7:
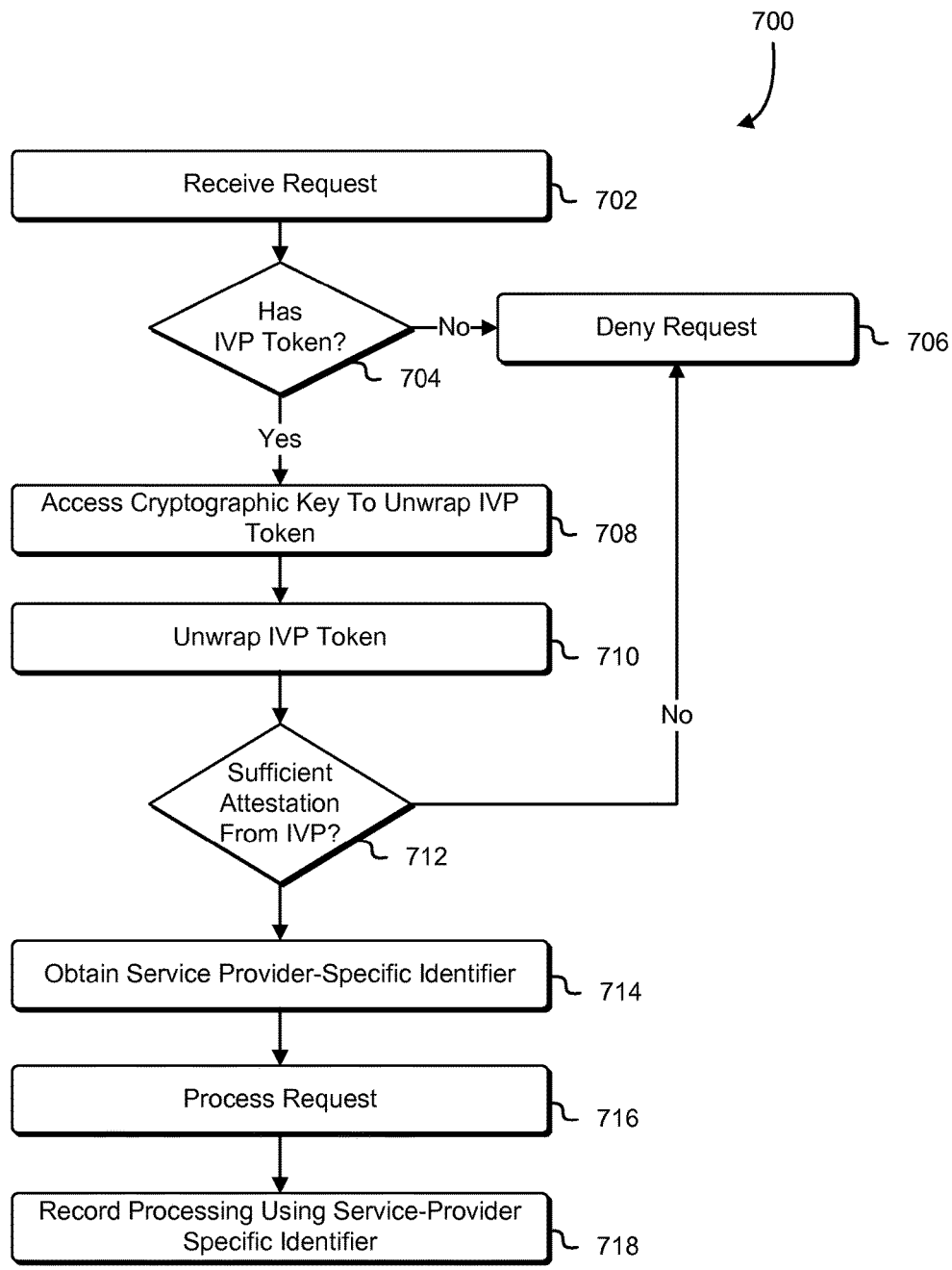
FIG. 7 shows an illustrative example of a process for processing a request for access to a resource in accordance with at least one embodiment.

FIG. 7 shows illustrative example of a process 700 which may be performed to process a request in accordance with various embodiments. The process 700 may be performed by any suitable system such as by a webserver of a computing resource service such as described above. The webserver may, for example, be configured with an identity verification provider configuration, such as described above. In an embodiment, the process 700 includes receiving 702 a request. The request may be received over a network from a user device. Upon receipt 702 of the request, the process 700 may include making a determination 704 whether the request has been submitted with an identity verification provider token. For instance, the process 700 may include determining whether the request was submitted with an identity verification provider token.

If determined 704 that the request was received 702 without a valid identity verification provider token, the process 700 may include denying 706 the request. Denying the request may be performed in any suitable manner such as by transmitting a communication indicating denial of the request and/or one or more reasons for the denial such as lack of an identity verification provider token and/or a prompt to authenticate. Further, denying 706 the request may also include simply inaction, such as by not fulfilling the request. Generally, any way by which a request may be denied may be used. If determined 704 that the request was received with a valid identity verification provider token, the process 700 may include accessing 708 a cryptographic key to unwrap the identity verification provider token where unwrapping the identity verification provider token may include decrypting some or all of the identity verification provider token. The cryptographic key may be accessed through any suitable manner, for example, as discussed above, an identity verification provider configuration may include one or more cryptographic keys, each corresponding to an identity verification provider. Accordingly, accessing a cryptographic key may include selecting an appropriate cryptographic key suitable for unwrapping the identity verification provider token. In some embodiments, for example, the identity verification provider token may be received with metadata that indicates an identity verification provider which thereby enables selection of a corresponding cryptographic key. Generally, any way by which a cryptographic key is able to unwrap the identity verification provider token can be accessed is considered as being within the scope of the present disclosure.

Upon accessing 708 the cryptographic key, the process 700 may include unwrapping 710 the identity verification provider token, where, as noted, unwrapping the identity verification provider token may include decrypting some or all of the token. Once the identity verification provider token has been unwrapped 710, the process 700 may include determining 712 whether there is sufficient attestation from an identity verification provider corresponding to the identity verification provider token. Determining 712 whether there is sufficient attestation from the identity verification provider may be performed in various ways in accordance with various embodiments. For example, a determination may be made simply whether identity verification provider token encodes an attestation that a user corresponding to a particular identity has promptly authenticated with the identity verification provider. It should be noted, however, that more complex determinations may be made and generally determining whether sufficient attestation from the identity verification provider may be performed by determining whether information in the identity verification provider token satisfies one or more conditions enforced by a system performing in the process 700. Generally, determining 712 whether there is sufficient attestation from an identity verification provider may include determining whether the token is valid where determining whether the token is valid may include determining if the token is decryptable and/or if a digital signature of the token (or a portion thereof) is valid. Validity of the token may also be determined based at least in part on contextual information and one or more conditions applied to the contextual information.

If determined that the identity verification provider token lacks sufficient attestation (or is otherwise invalid), the process 700 may include denying 706 the request such as described above. However, if determined 712 that the identity verification provider token has sufficient attestation from the identity verification provider, the process 700 may include obtaining 714 a service provider-specific identifier. Obtaining 714 the service provider-specific identifier may be performed in various ways in accordance with various embodiments. For example, as discussed above, an identity verification provider configuration may include a mapping of identity verification provider identity to service-specific identities and the mapping may be used to determine the service provider-specific identifier. As noted above, different systems performing the process 700 or variations thereof may obtain different service provider-specific identifiers for the same identity verification provider identity, in this manner making it more difficult to track user activity across multiple services.

Further, the process 700 may include processing 716 the request which may include performing one or more operations and/or causing one or more operations to be performed. Processing the request may include recording 718 the processing using the service provider-specific identifier. For example, usage of the services provided by a system performing the process 700 or a system in which the system performing the process 700 is a subsystem. Activities of the user that submitted 702 the request may be tracked using the service provider-specific identifier. Further, the process 700 may include providing the system that submitted the request the service provider-specific identifier (e.g., encoded in a cookie) to enable the system to identify itself to the system performing the process 700 for future requests. Other operations that may be performed include, but are not limited to, generating information usable by the client device for a session and providing the information to the client that submitted the request.

As discussed above, techniques of the present disclosure may be used to provide authentication services to users of a computing resource service provider. For example, as discussed, various entities may utilize services of the computing resource service provider to provide their own services using the resources hosted by the service provider. An entity, for example, may utilize a virtual computer system service and/or one or more data storage services to provide a website or backend to an application such as a mobile application. Various techniques described and suggested here enable such entities to focus on the services they provide while diverting minimal focus to authentication which is managed by a service provider.

Figure 8:
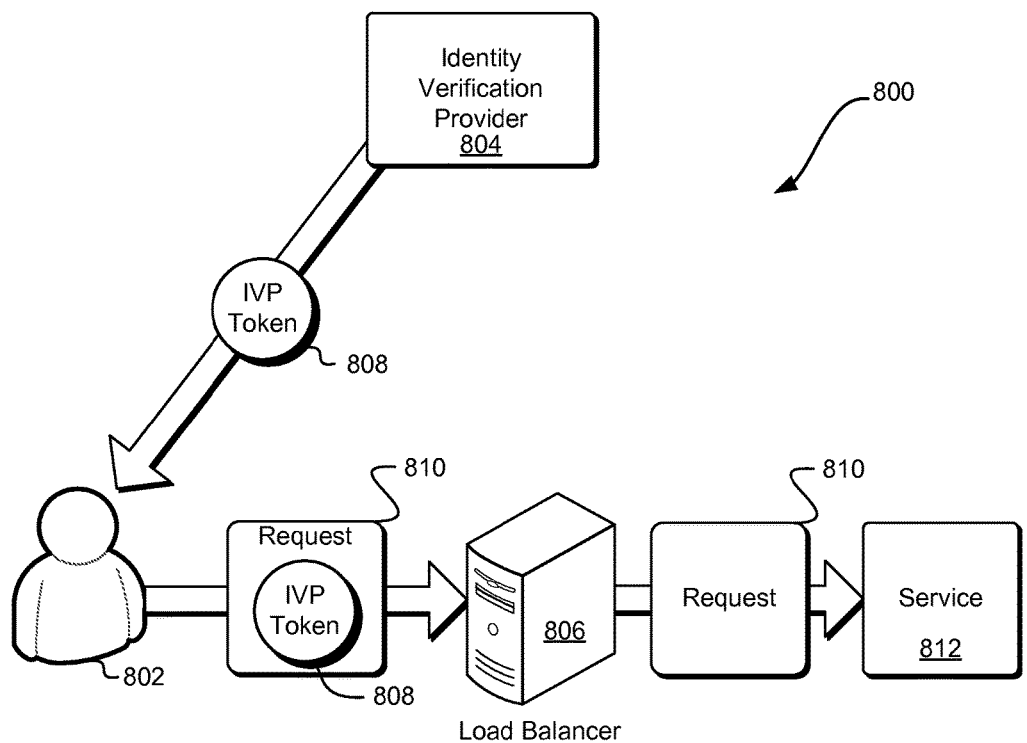
FIG. 8 shows an illustrative example of an environment in which various embodiments can be practiced.

FIG. 8 accordingly shows an illustrative example of an environment 800 in which various embodiments may be practiced. In an embodiment a user 802 communicates with an identity verification provider 804 to obtain from the identity verification provider 804 an identity verification provider token 808, such as described above. The user 802 may submit a request 810 with the identity verification provider token 808 received from the identity verification provider 804. The request 810 may be submitted by providing the request 810 to a load balancer 806, which may be a computer system configured to verify identity verification provider tokens and, upon verification, route requests to a service 812. The load balancer may apply one or more techniques for distributing workloads across multiple servers in embodiments where the service 812 comprises multiple servers. Accordingly, the load balancer 806 may verify the validity of the identity verification provider token 808 and if the identity verification provider token 808 is valid, provide the request 810 to the service 812 (e.g., to a server used to implement the service).

Figure 9:
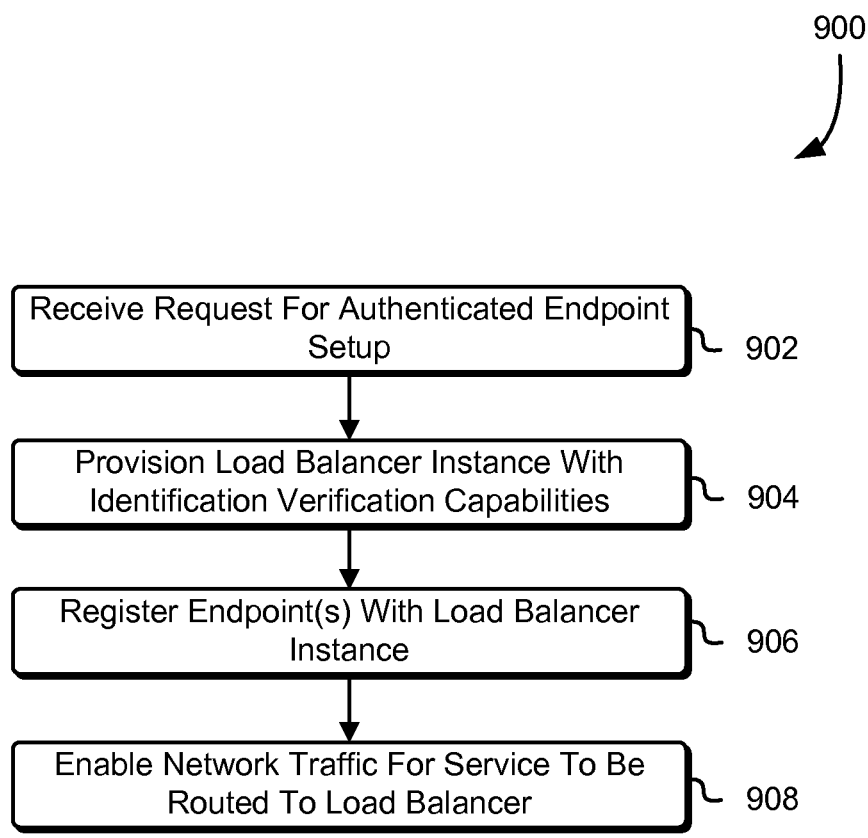
FIG. 9 shows an illustrative example of a process for providing authentication services in accordance with at least one embodiment.

FIG. 9 shows an illustrative example of a process 900 which may be used to provide authenticated endpoint services in accordance with various embodiments. The process 900 may be performed by any suitable system such as by a virtual computer system service such as described above. In an embodiment of the process 900 includes receiving 902 a request for an authenticated endpoint setup. The request may be received 902 in various ways in accordance with various embodiments such as by way of an appropriately-configured and authentic (e.g., digitally signed with an appropriate cryptographic key) application programming interface (API) call to the virtual computing system service. Upon receipt 902 of the request, the process 900 may include provisioning 904 a load balancer instance with identification verification capabilities. Provisioning 904 of the load balancer instance may be performed in various ways in accordance with various embodiments. For example, a provisioning workflow may be followed to provision the load balancing instance where the load balancing instance is a virtual computer system configured to perform various operations related to identity verification and load balancing. Although it should be noted that while the term load balancer is used, the load balancer may not balance load among multiple (but may provide load to a single network endpoint, such as a single web server sitting behind the load balancer). Provisioning 904 the load balancer instance may include, for example, selecting an appropriate hardware device able to implement the load balancer instance loading a machine image of the load balancer instance on the selected hardware and causing the load balancer instance to launch (e.g., complete a startup process).

The process 900 may also include registering 906 one or more endpoints with the load balancer where an endpoint is a system (e.g., server) to which the load balancer instance can direct network traffic received by the load balancer. Registering the one or more end points with the load balancer instance may include configuring the load balancer instance to route traffic to the one or more end points in accordance with one or more load balancing algorithms or generally to route network traffic to the one or more endpoints. It should be noted that one or more (perhaps all) of the one or more endpoints may be hosted by the service provider whose service performs the process 900, for instance, by a virtual computer system service. In some embodiments, one or more (perhaps all) of the endpoints are hosted by another entity, such as a customer of the service provider on premises or by another service provider.

The process 900 may also include enabling 908 network traffic for a service provider using the end points to be routed to the load balancer. The load balancer may, for example, sit in a network of computing devices of a computing resource service provider and one or more network appliances may be configured to route traffic to an IP address of the load balancer received over the Internet or another network to the load balancer to enable the load balancer to operate and route the traffic accordingly.

Figure 10:
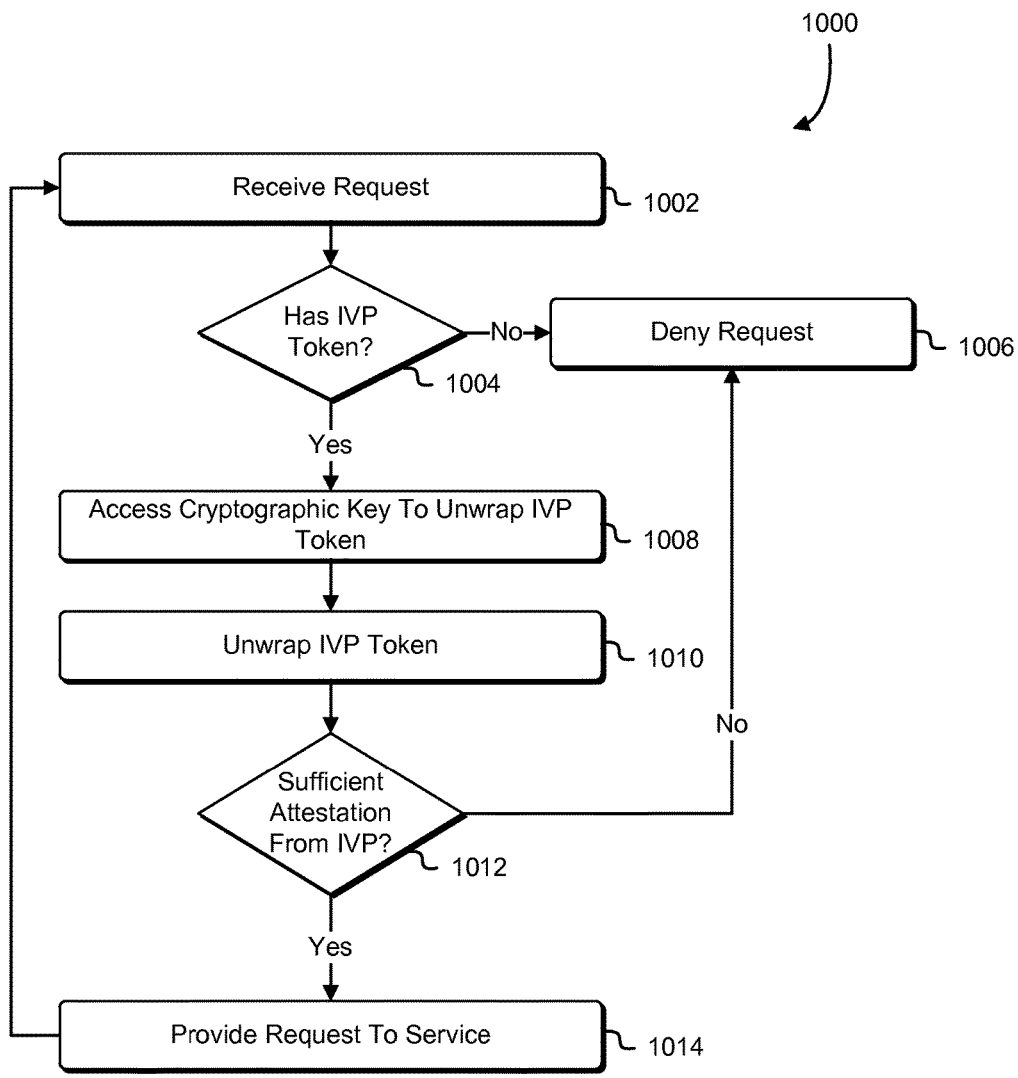
FIG. 10 shows an illustrative example of a process for providing authentication services in accordance with at least one embodiment.

FIG. 10 shows an illustrative example of a process 1000 which may be used to provide authenticated endpoint services in accordance with an embodiment. The process 1000 may be performed by a system participating in an authenticated endpoint service, such as a load balancer instance such as described above. In an embodiment, the process 1000 includes receiving 1002 a request such as described above (e.g., over a network such as the Internet). A determination may be made 1004 whether the request is received with an identity verification provider token, such as described above. If determined 1004 that the request is submitted without an identity verification provider token, the process 1000 may include denying 1006 the request, such as described above. If, however, it is determined 1004 that the request is submitted with an identity verification provider token, the process 1000 may include accessing 1008 a cryptographic key usable to unwrap the identity verification provider token such as described above.

The identity verification provider token may be unwrapped 1010 and a determination may be made 1012 whether the identity verification provider has sufficient attestation from a corresponding identity verification provider and, generally, whether the token is valid, such as described above. If it is determined 1012 that the identity verification provider token lacks sufficient attestation from a corresponding identity verification provider, the process 1000 may include denying 1006 the request. If, however, it is determined 1012 that the identity verification provider token includes sufficient attestation from the identity verification provider, the process 1000 may include providing 1014 a request to the service which may include transmitting the request over a network to an endpoint registered with a system performing the process 1000. As indicated in the Figure, the process 1000 may repeat as a system performing the process 1000 receives 1002 requests. Accordingly, a service to which network traffic is routed utilizing the process 1000 or a variation thereof is able to operate without the overhead required to determine whether the requests are submitted with sufficient authentication.

As discussed, variations of the processes described herein are considered as being within the scope of the present disclosure. For example, FIGS. 7 and 10 illustrate processes where tokens are decrypted and validity of tokens (e.g., sufficient attestation) is determined based at least in part on the decrypted tokens. As discussed, tokens may be provided in plaintext form where authenticity of the token is determinable by an electronic signature. Accordingly, processes may be modified in accordance with such encoding techniques. Further, in some embodiments, some of a token is provided in plaintext form and some is provided in encrypted form. Validity of a token may be determined based at least in part on information encoded in the plaintext data and/or encoded in the decrypted data (e.g., after decrypting). Other variations are also considered as being within the scope of the present disclosure.

Figure 11:
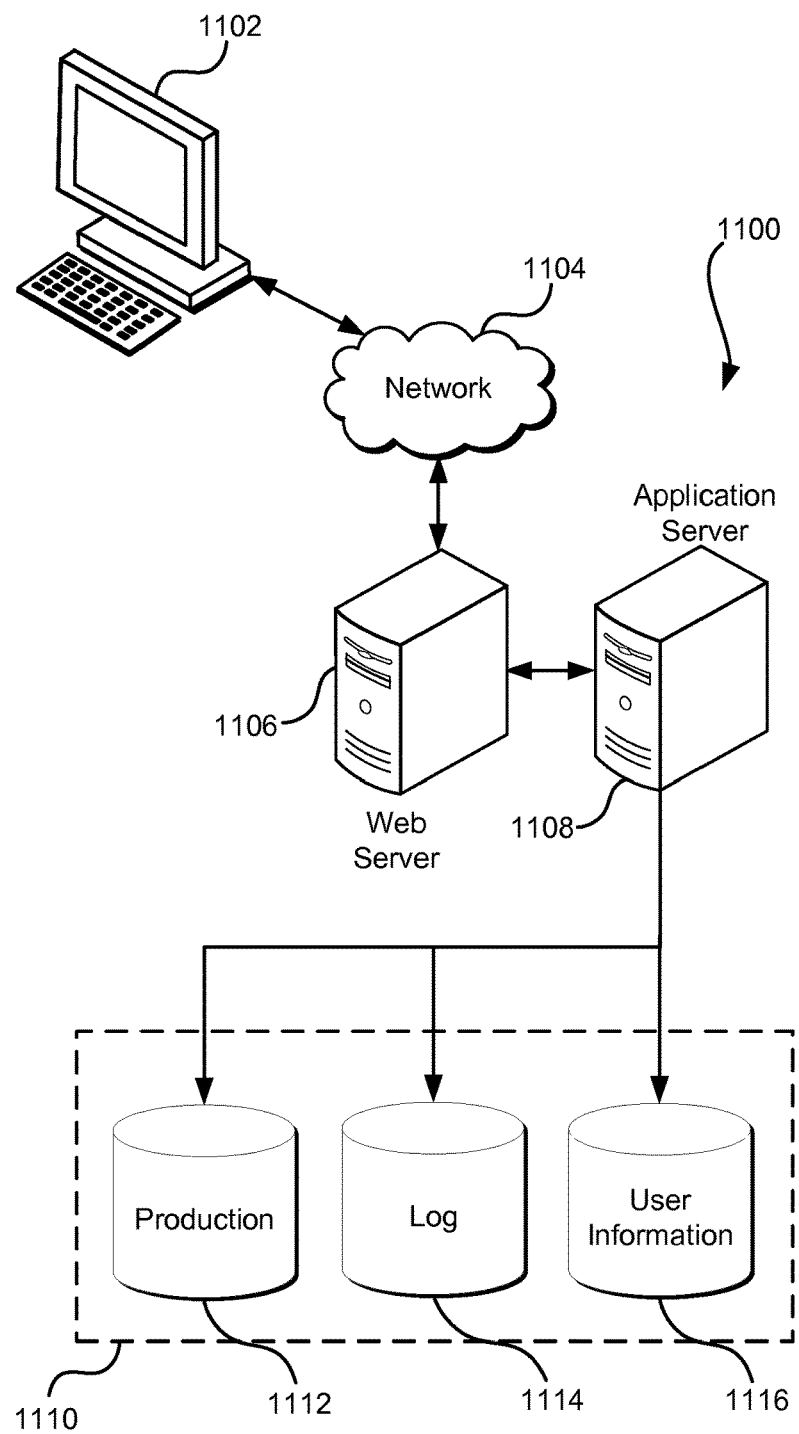
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising: at a first system of a computing resource service provider:
   collecting cryptographic information from a plurality of identity verification providers, the cryptographic information including a plurality of cryptographic keys, each cryptographic key usable to analyze tokens generated by a different identity verification provider of the plurality of identity verification providers; and
   providing configuration information to a plurality of systems of the computing resource service provider different from the first system, the configuration information including at least the plurality of cryptographic keys, the configuration information provided to the plurality of systems being specific to each of the plurality of systems; and
   by one of the plurality of systems of the computing resource service provider different from the first system:
   receiving, from a requestor that is separate from the plurality of identity verification providers and the first system, a request that includes a submitted token;
   determining, using the configuration information already provided by the first system, that the submitted token includes a valid attestation by the identity verification provider associated with the one of the plurality of cryptographic keys and that the requestor is allowed to have the request fulfilled, the requestor lacking access to the plurality of cryptographic keys; and
   when it is determined that the requestor is allowed to have the request fulfilled, fulfilling the request.

2. The computer-implemented method of claim 1, wherein the identity verification provider associated with the one of the plurality of cryptographic keys is managed by a third-party entity.

3. The computer-implemented method of claim 1, further comprising:
   selecting, from the cryptographic information, the one of the plurality of cryptographic keys corresponding to the identity verification provider associated with the one of the plurality of cryptographic keys; and
   using the one of the plurality of cryptographic keys to decrypt the submitted token.

4. The computer-implemented method of claim 1, wherein both receiving the request and using the configuration information to analyze the submitted token are performed by a server of the different system.

5. The computer-implemented method of claim 1, wherein:
   the different system is one of a plurality of services;
   the configuration information includes a mapping usable to map identities of the identity verification providers to client identifiers; and
   each service of the plurality of services is provided a different mapping such that different services map a same client identity verification provider identity to different client identifiers.

6. The computer-implemented method of claim 1, wherein:
   the different system provides a computing resource service of a computing resource service provider utilized by a third party to provide a third-party service; and
   fulfilling the request includes providing the request to the different system for processing.

7. A system, comprising:
   memory to store instructions that, as a result of execution by one or more processors, cause a collection of computing devices to collectively implement one or more services, each service of the one or more services that locally:

obtain, by a first system of a computing resource service provider, cryptographic information corresponding to a plurality of identity verification providers, the cryptographic information including a plurality of cryptographic keys, each cryptographic key usable to verify validity of tokens generated by a different identity verification provider of the plurality of identity verification providers;

identify, by the first system, from the plurality of identity verification providers to which a client computing device has access, a second plurality of identity verification providers for which tokens will be accepted;

provide, by the first system, configuration information to a plurality of systems of the computing resource service provider different from the first system, the configuration information including at least a second plurality of cryptographic keys associated with the second plurality of identity verification providers, the configuration information provided to the plurality of systems being specific to each of the plurality of systems;

receive, by a second system which is one of the plurality of systems of the computing resource service provider different from the first system, from a requestor that is separate from the plurality of identity verification providers and the first system, a request, the request including a token, the requestor lacking access to the plurality of cryptographic keys;

identify, by the second system, that the token is associated with an identity verification provider of the second plurality of identity verification providers;

verify, by the second system and using the configuration information already provided by the first system, validity of the token based on a cryptographic key specific to the identity verification provider and usable to verify validity of tokens generated by the identity verification provider; and when the validity of the token is verified, fulfill, by the second system, the request.

8. The system of claim 7, wherein the service includes a server that both accesses the cryptographic information and uses the cryptographic information to verify the validity of the token.

9. The system of claim 8, wherein the server is from a plurality of servers each operable to:
receive the request and the token;
access the cryptographic information; and
use the cryptographic information to verify the validity of the token.

10. The system of claim 7, wherein the service further selects, based at least in part on the token, the cryptographic information from multiple instances of cryptographic information each corresponding to a different identity verification provider.

11. The system of claim 7, wherein the collection of computing devices further implement a managed federation propagator that:
tracks updates to a set of identity verification providers that include the identity verification provider; and
provides updated configuration information to the one or more services in accordance with the tracked updates, the updated configuration information including information necessary for verifying tokens generated by the identity verification providers.

12. The system of claim 11, wherein the managed federation propagator further provides the updated configuration information to one or more third-party services thereby enabling the one or more third-party services to verify tokens generated by the identity verification providers.

13. The system of claim 7, wherein:
the one or more services comprise a plurality of services; and
the service, for each identity verification provider identity of a plurality of identity verification provider identities, maps the identity verification provider identity to a client identifier unique to the service and different from another client identifier to which another service maps the verification provider identity.

14. The system of claim 13, wherein:
the service tracks usage of the service in association with a first client identifier; and
the system further comprises at least one backend service that aggregates usage information from each service of the plurality of services by at least mapping different client identifiers corresponding to a same identity verification provider identity to the same verification provider identity.

15. A non-transitory computer-readable storage medium that stores executable instructions that, as a result of being executed by one or more processors of a service provider computing device, cause the service provider computing device to:
obtain, by a device, cryptographic information corresponding to a plurality of identity verification providers, the cryptographic information including a plurality of cryptographic keys, each cryptographic key usable to verify validity of tokens generated by a different identity verification provider of the plurality of identity verification providers;

provide, by the device, configuration information to a plurality of services of the service provider, the services different from the device, the configuration information including at least the plurality of cryptographic keys, the configuration information provided to the plurality of services being specific to each of the plurality of services;

receive, over a network by one of the plurality of services of the service provider, a request from a client computer system to access the service, the request being:
provided with a token encrypted with a cryptographic key of the plurality of cryptographic keys, the token indicating an identity verification provider accessible to the client computer system; and
received from a client computer system associated with a user of the service, the client computer system being separate from the plurality of identity verification providers and the device, and lacking access to the plurality of cryptographic keys;

identify, by the service, that the token is associated with a corresponding identity verification provider in a subset of the plurality of identity verification providers, the subset of the plurality of identity verification providers being authorized to enable fulfillment of requests by the service;

decrypt, by the service, the token based at least in part on the cryptographic key specific to the corresponding identity verification provider;

verify, by the service and using the configuration information already provided by the device, validity of the token based at least in part on the cryptographic key specific to the corresponding identity verification provider; and when the validity of the token is verified, cause the request to be fulfilled by the service.

16. The non-transitory computer-readable storage medium of claim 15, wherein the executable instructions that cause the service provider computing device to cryptographically verify the token include instructions that cause the service provider computing device to identify whether the token includes an attestation that the client computer system was used to successfully authenticate with the identity verification provider.

17. The non-transitory computer-readable storage medium of claim 15, wherein:
the service is managed by a third party to the service provider; and
causing the request to be fulfilled includes providing the request to a computing device managed by the third party.

18. The non-transitory computer-readable storage medium of claim 15, wherein the executable instructions further cause the service provider computing device to select, based at least in part on the token, the cryptographic information specific to the identity verification provider from among other cryptographic information specific to one or more other identity verification providers of the plurality of identity verification providers.

19. The non-transitory computer-readable storage medium of claim 15, wherein the executable instructions further cause the service provider computing device to:
receive configuration information from another system, the configuration information necessary for validating instances of a set of identity verification providers that include the subset of the plurality of identity verification providers; and
reconfigure in accordance with the configuration information.

20. The non-transitory computer-readable storage medium of claim 15, wherein:
the service provider hosts computing resources for a plurality of customers of the service provider; and
causing the request to be fulfilled includes utilizing at least one computing resource of a customer of the service provider.

21. The non-transitory computer-readable storage medium of claim 15, wherein the executable instructions further cause the service provider computing device to generate, based at least in part on the token, a client identifier for the client computer system to uniquely identify the client computer system within the service.

* * * * *